March 17, 1959  M. J. BOYER ET AL  2,877,661
WINDSHIELD WIPER CONTROL

Filed Sept. 10, 1956  2 Sheets-Sheet 1

E. A. DVORAK
M. J. BOYER
INVENTORS

BY

ATTORNEYS

March 17, 1959 M. J. BOYER ET AL 2,877,661
WINDSHIELD WIPER CONTROL
Filed Sept. 10, 1956 2 Sheets-Sheet 2

E.A. DVORAK
M.J. BOYER
INVENTORS

BY E.C. McRae
J.R. Faulkner
J.H. Oster

ATTORNEYS

United States Patent Office 2,877,661
Patented Mar. 17, 1959

2,877,661

WINDSHIELD WIPER CONTROL

Marion J. Boyer and Edwin A. Dvorak, Detroit, Mich., assignors to Ford Motor Company, Dearborn, Mich., a corporation of Delaware Application September 10, 1956, Serial No. 608,840

6 Claims. (Cl. 74—503)

This invention relates to windshield wiper controls and more particularly to a uni-directional finger touch contact and control of a windshield wiper motor of either the electric or vacuum types.

In the past, controls for windshield wiper motors were of the knob type in which the selective rotation of the knob from inoperative to maximum operative position gave an infinite variable rate of wiper speeds. It is the object of this invention to provide a mechanism whereby a positive windshield wiper speed is obtained from a very slow to a very fast action. In the applicants' invention there is provided a pawl and ratchet movement whereupon the selective movement of the control knob in a vertical direction about a transverse pivot brings about a definite change in the wiper speed. The knob may be progressively pivoted to progressively increase the wiper speed. Upon the completion of the selective positioning the knob is urged to a normal neutral position where again it may be activated manually for further wiper control. At any time the selector knob may be moved in an opposite direction which permits the wiper control rod to be returned to the inoperative position and ready for the next actuation.

One of the objects of this invention is to provide a windshield wiper control having a definite range of speed increments.

Still another object is to provide a windshield wiper control which may be actuated in progressive definite speed increasing steps by a finger touch pivoting knob.

Still another object is to provide a windshield wiper control mechanism of a non-rotational type with definite indexed speeds and having a manually operatable overriding inoperative control for any one of the indexed speeds.

Other objects and advantages of this invention will be made more apparent as this description proceeds, particularly when considered in connection with the accompanying drawings wherein.

Figure 1:
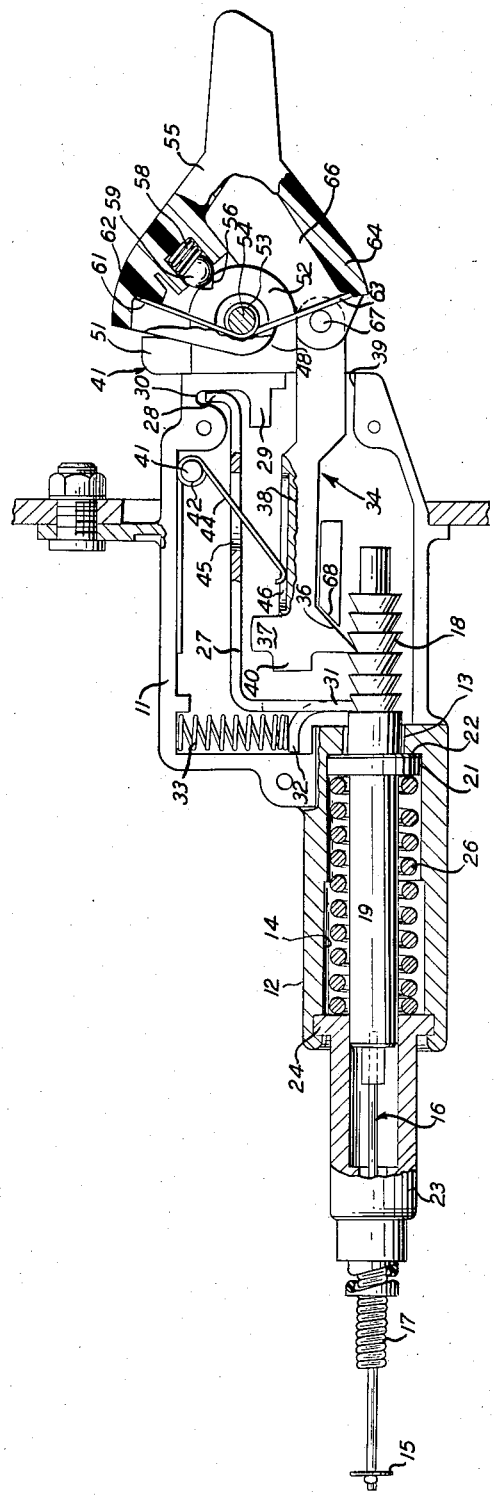
Figure 1 is a side elevational drawing partly in cross section of an embodiment of the invention and showing the control in a neutral position.

Referring now to the drawings, the control rod mechanism of the applicants' invention comprises a box like housing 11 open on one side, an integral tubular like extension 12 extending longitudinally of the housing and having an aperture 13 adjacent the housing which is smaller than and concentric with the extending bore 14 in the extension 12, an indexed control rod 16 comprising a typical Bowden cable construction 17 which is slidably movable within the bore 14 of the extension. At the one end of the control rod are a plurality of indexed serrations or ratchets 18 indicating definite speed increments from an inoperative to a maximum operative position. The serrations 18 are part of shaft-like connector 19 having a washer type shoulder 21 adjacent the aperture 13 in the housing. The washer 21 at the time of inoperative position rests against the shoulder 22 of the housing. At the forward end of the extension a sleeve 23 having a radially outwardly extending flange 24 is secured to the extension such as by peening to form an outer non movable extension. A spring 26 is inserted between the fixed washer 21 and the flange 24 to bias the control rod 16 longitudinally inwardly and against the shoulder 22 of the housing.

Inwardly of the housing is a substantially L shaped anchor 27 which has one leg 28 positioned atop a transverse ledge 29 below a vertically disposed slot 30 in the far end of the housing so that the anchor will pivot about the slot 30 in a free floating manner. The securing end of the anchor is a downwardly extending angled point 31 similar to the angle of the serrations with an integrally cut and bent section 32 bent substantially at a right angle and extending longitudinally forwardly of the anchoring point 31 to form a platform. A spring 33 biased against the upper portion of the housing and the platform section 32 urges the anchor point 31 in contact with one of the serrations 18 on the control rod. The movement of the control rod 16 from inoperative to maximum operative position is accomplished by a hammer like push arm pawl 34 whose operating point 36 is angled in a like manner to the serrations on the control rod 16. Opposite to this end is a blunt extension 37 which is operable for a purpose to be later explained. The handle like extension 38 of the pawl is bent at a position forwardly of the ledge 29 in a downward direction and then bent again to extend longitudinally to project through an enlarged hole 39 at the rear part of the housing 11. Extension 38 also extends longitudinally forwardly of the point 36 and blunt extension 37 to form a projection 40 for a purpose to be described later. A pivoting pin 41 is located forwardly of the upstanding vertical slot 30 for the anchor and a spiral spring 42 is mounted thereto so that the upper arm 43 is biased against the upper housing and the lower arm 44 extends through a longitudinally extending slot 45 in the anchor 27 to bottom in a groove in the pawl extension 38 to urge the pawl in contact with the serrations. It can thus be seen that both the anchor 27 and the pawl 34 are spring urged in contact with the control rod serrations while the control rod itself is spring urged in the direction of inoperative position against the anchoring point 31 and the operating point 36 of the anchor and pawl respectively.

Exteriorly of the rearward section of the housing and integral therewith is a laterally disposed substantially U shaped bracket generally indicated at 47 which has rearwardly extending cam faced pivot arms 48 and 49 and an upstanding medially disposed stop 51. The arms are inwardly cut at their laterally outward extremities to provide for an angled boss 52 for keeping the torsion springs 53 in tension on a transversely extending pivot shaft 54 journaled in each of the arms 48 and 49. A partially hollowed control knob 55 is pivoted about the pivot defined by the shaft 54 and substantially covers the arms 48 and 49. Arm 48 is notched to form a detent 56 which defines a neutral position of the knob 55. An inwardly extending drilled hole 47 in the knob opposite the cam-like arm 48 is provided with a spring 58 and a ball 59 whereby the spring loaded ball is held yieldably in contact with the cam arm 48. Upon reaching the detent the spring 58 will force the ball 59 into contact with the detent 56 and hold the knob in the neutral position as shown in Figure 1.

When the knob 55 is in the neutral position indicated by Figure 1, the upper arm 61 of the return spring 53 is in contact with both the upper angled face of the boss 52 and transversely extending depending boss 62 inwardly of the upper leading edge of the knob. The lower spring arm 63 is in contact with both the lower angled face of the boss 52 and generally vertically extending groove 64 of the lower leading edge of the knob. Medially of the knob and extending forwardly and downwardly thereof from a point below the spring 58 and the ball 59 are a pair of laterally spaced apart arms 66 which straddle and pivotally secure the pawl extension 38 to the arms 66 on a short shaft 67.

When the upper motor is activated the knob 55 is pivoted downwardly about the axis defined by the shaft 54, and the pawl which is in contact with one of the serrations is moved longitudinally forwardly moving the control rod likewise one increment. During this movement the anchor spring 33 is overcome and the anchor point 31 rides over one serration and engages the subsequent serration. Projection 40 prevents the movement of two increments in one pivot action by striking the anchor point 31 should the pawl be pushed forwardly more than one increment movement. In addition, the arms 66 will also strike the housing adjacent the enlarged aperture 39 thus providing a double stop. At the time when the knob was pivoted downwardly the lower spring arm 63 resting in the groove 64 was moved with the knob putting the spring 53 in greater tension. Upon the release of the knob spring arm 63 will move the knob upwardly until the ball 59 strikes the detent 56. Upon the completion of the final speed increment with stop washer 15 of the control rod 16 will bottom against an appropriate shoulder of the windshield wiper motor (not shown) to effectively prevent further forward control rod movement.

Figure 4:
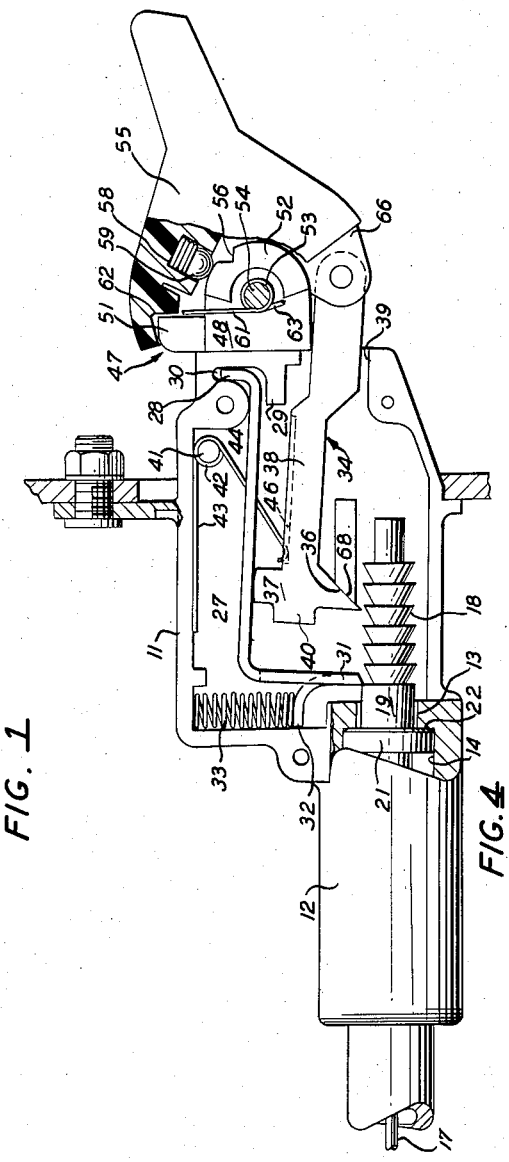
Figure 4 is a view showing the control rod in a returned position after the pawl and anchor have been raised.
Figure 3:
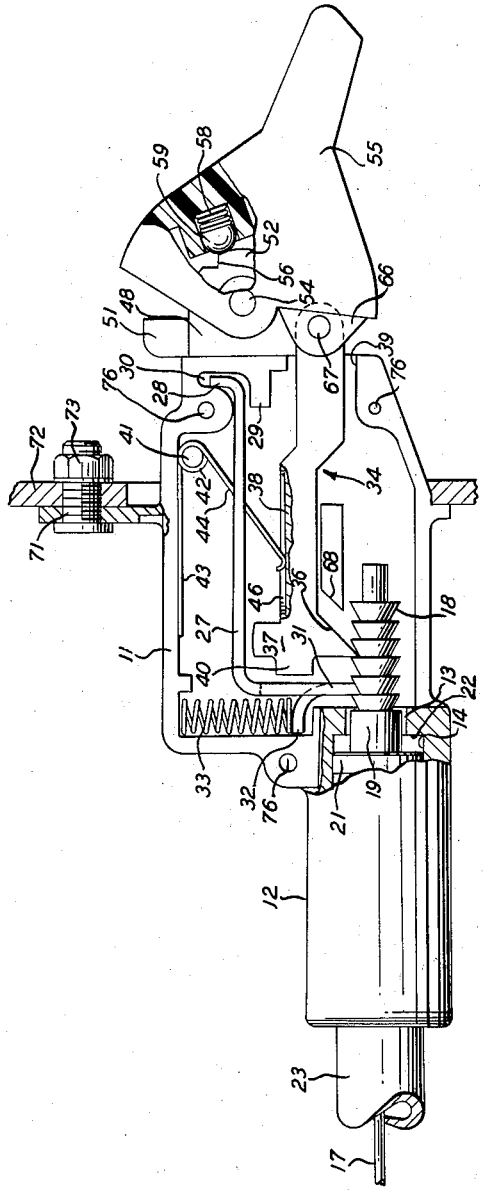
Figure 3 is a cross sectional view showing the pawl in the first operating position after initial movement of the control knob.
Figure 2:
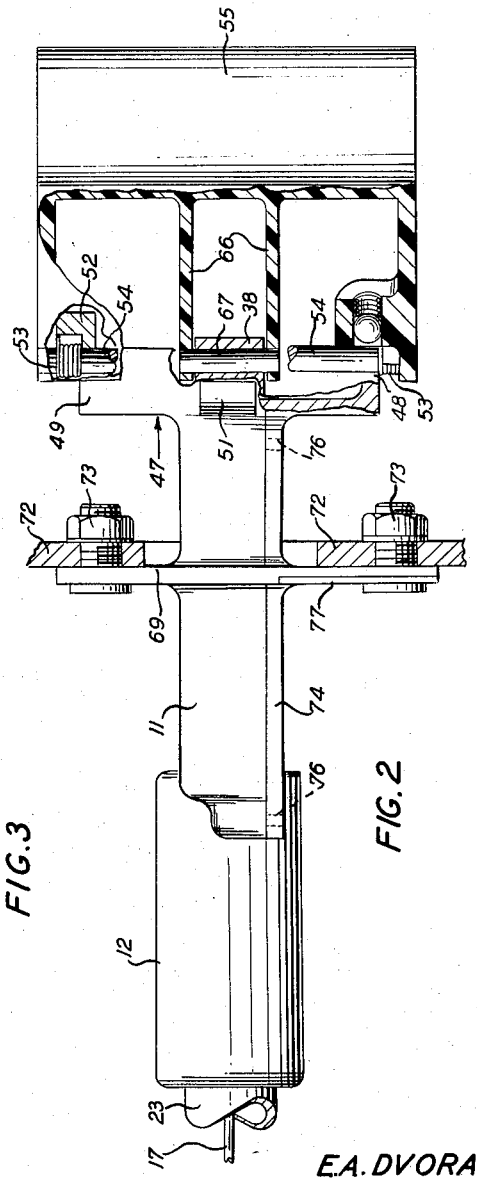
Figure 2 is a plan elevational view of Figure 1 and partly in cross section.

In Figure 4 the device is shown after the return of the control rod to the inoperative position which may be done at any time and after any one of the speed increment serrations. This is accomplished by the upper vertical movement of the control rod about the pivot axis defined by shaft 54 which pulls back the pawl 34 until the operating point 31 strikes the angled face 68 of a horizontally disposed ledge integral with the housing and located between the pawl 34 and the control rod 16. Further rearward movement of the pawl forces the pawl point 31 to climb the face 68 until the blunt extension 37 of the pawl strikes the anchor 27 and thus overcomes the resistance of spring 33 and lifting the anchor from its position on one of the serrations. As a result control rod spring 26 urges the control rod rearwardly until the washer 21 bottoms against the shoulder 22 of the housing. The further upward pivotal movement of the knob is prevented by the depending boss 62 striking the stop 51 medially of the arms 48 and 49. As can be seen in Figure 4 the upper spring arm 61 has been pushed forwardly stressing the spring 53 to a greater extent. Upon the release of the knob the spring arm 61 will return the knob back to the point where the ball 59 strikes the detent 56.

It can thus be seen that the applicants have provided a simple indexed ratchet like control for a windshield wiper whereby simple pivotal movements of a control knob about a transversely pivot axis will either progressively increase the speed of the wiper mechanism or return it immediately to its inoperative position. The control mechanism may be easily installed by means of an integrally transversely extending rib 69 having mounting holes 71 in alignment with like holes in the dash panel 72 or other body section and holding them together by bolt means 73. A side cover 74 is placed over rivet like projections 76 on the housing 11 and may be peened over for securing the cover 74 to the housing. The side cover 74 also has a transversely extending rib 77 which abuts the wall of the transversely extending rib 69 to adequately complete the assembly.

It will be understood that this invention is not to be limited to the exact construction shown and described, but that various changes and modifications may be made without departing from the spirit and scope of this invention, as defined in the appended claims.

What is claimed is:

1. A manually operable control mechanism comprising a box-like container with a tube-like extension at one end and an enlarged opening at the other end, a control member movable within said tube-like extension, said control member having a series of notches at the end of said member which extends into said box-like container, said notches defining a range of predetermined control positions from inoperativeness to maximum operativeness, resilient means in said extension urging said control member in the direction of the inoperative position, a push arm in engagement with one of said notches and having a portion of its length extending through said enlarged opening, manually operable means pivotally mounted to said container above said enlarged opening and to the portion of said arm extending through said opening, locking means in said container, and resilient means urging said locking means in contact with one of said notches and holding said control member in one of the predetermined positions between inoperativeness to maximum operativeness.

2. A control for a windshield wiper motor comprising in combination a longitudinally extending housing having a removable cover on one side, a cylindrical extension at one end and an enlarged aperture at the other end, a control rod having truncated cone like serrations in end to end relationship at one end and means for actuating said motor at the other end, said control rod being slidably housed in said cylindrical extension so that the serrations extend inwardly into said housing, control rod spring means biasing said control rod towards said housing, means on said control rod engageable with said housing to define the inoperative stop on said control rod, a push arm having an engaging head in contact with one of said serrations, a square projection on the side opposite to said engaging head and an extension projecting through said enlarged aperture, pivoting means externally of said housing and above said enlarged aperture, a manually operable knob pivotally mounted to said pivoting means and pivotally secured to said extension of said push arm, means for urging said knob to a neutral position, means for resiliently maintaining said knob in said neutral position, spring biased anchoring means in said housing engageable with one of said serrations, and spring means urging said push arm engaging head in contact with one of said serrations.

3. The structure defined by claim 2 which is further characterized in that said pivot means externally of said housing comprises a substantially U shaped member integral with said housing and defining a pair of laterally spaced apart arms, said arms having cam-like faces, and that said means urging said knob to a neutral position comprises at least one coil spring mounted exteriorly of said arm and laterally therewith and anchored in a fixed open position, said pivotal movement of said knob positively stressing said spring.

4. The structure defined by claim 2 which is further characterized in that inside the housing adjacent the area of the pivoting means for the manually operable knob there is provided a vertical upstanding enlarged slot with bottom section of the slot open to the interior of the housings, a support below said slot integral with said housing adjacent said pivoting means and extending longitudinally upwardly of said housing, and said anchoring means comprising a longitudinally extending member having an upwardly bent short arm positioned in said slot, a depending bent section at the opposite end of the longitudinally extending member, said depending bent section having an angled anchoring point engaging one of said serrations nearest the extension, a horizontally disposed forwardly extending platform integral with said depending bent section at a vertical medial point therewith, and a vertically positioned coil spring mounted between said platform and said housing urging said depending bent section anchoring point in engagement with one of said serrations.

5. A windshield wiper control of a uni-directional type comprising in combination a housing having a tubular extension at one end and a rectangular hole at the other end, a control rod having a wiper motor actuating means at one end and a plurality of ratchet detents at the other end, said rod being slidably mounted within said tubular extension so that the ratchet end of the rod extends into said housing, a coil spring urging said control rod in the direction of the housing, stop means in said tubular extension adjacent the housing defining an inoperative position of the control rod, a hammer-like pawl engageable with one of said ratchet detents inside said housing, and having an extension protrude through said rectangular hole, a transversely extending pivot support integrally formed with said housing above the rectangular hole and having an upstanding projection defining a stop, a pair of spaced apart parallel arms extending longitudinally rearwardly of said housing from said pivot support, said arms having arcuate formed faces and a coaxially aligned aperture, an externally located notch defining the neutral position of said brake pawl on one of said arcuate faces, a hooded control knob extending rearwardly of and straddling said arms, a common transverse pivot pin journaled in said coaxially aligned apertures for pivotally mounting said knob to said arms, said hooded section having a cooperatively hollowed area conformable with the arcuate face of said arms and substantially hiding said arms, a transverse recess inwardly of the leading edge of the knob defining a shoulder engageable with the stop on said pivot support which defines the release position of the knob, an inwardly extending hole in alignment with said notched arcuate face, a coil spring and a ball mounted within the hole urged by the spring against the arcuate face, a coil spring positioned between each arm and the knob on said pivot pin urging the knob to rotate to the neutral position for said ball to engage said notch and yieldably hold the knob in said neutral position, a pair of downwardly and forwardly extending narrowly spaced arms integral with said knob straddling the extension on said pawl and pivotally connected therebetween on a common pivot pin, anchoring means positioned in said housing and engageable with one of said ratchet detents and means urging said pawl downwardly in a yieldable engaging contact with one of said ratchet detents.

6. A control mechanism comprising a movable member shiftable longitudinally along a fixed axis and spring urged in one direction, ratchet means secured to said movable member and arranged to prevent movement of said movable member in the direction of the spring bias, a working pawl member engageable with said ratchet means, a working pawl moving means capable of moving said working pawl member along a path approximately parallel to the movement of the movable member, working pawl lifting means capable of lifting the working pawl member clear of the ratchet means as the working pawl member is moved along its path, a holding pawl member normally in engagement with the ratchet means, said holding pawl member being placed adjacent the working pawl member so that the working pawl member in its extreme lifted position will lift the holding pawl member out of engagement with the ratchet means.

References Cited in the file of this patent

UNITED STATES PATENTS

| | | |
|---|---|---|
| 2,251,893 | Snell | Aug. 5, 1941 |
| 2,565,873 | Meyer | Aug. 28, 1951 |
| 2,669,884 | Sandberg | Feb. 23, 1954 |